US 7,711,885 B2

(12) United States Patent
Hatakeyama

(10) Patent No.: US 7,711,885 B2
(45) Date of Patent: May 4, 2010

(54) BUS CONTROL APPARATUS AND BUS CONTROL METHOD

(75) Inventor: Tsutomu Hatakeyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 12/099,850

(22) Filed: Apr. 9, 2008

(65) Prior Publication Data

US 2008/0259700 A1    Oct. 23, 2008

(30) Foreign Application Priority Data

Apr. 17, 2007    (JP)    ............................. 2007-108394

(51) Int. Cl.
*G06F 13/14* (2006.01)
*G06F 13/24* (2006.01)

(52) U.S. Cl. ...................................... 710/305; 710/260

(58) Field of Classification Search ................ 710/305, 710/306, 313, 314, 260, 268; 711/147
See application file for complete search history.

(56) References Cited

U.S. PATENT DOCUMENTS

| | | | | |
|---|---|---|---|---|
| 5,375,219 | A | * | 12/1994 | Okabe ........................ 711/147 |
| 6,052,151 | A | * | 4/2000 | Tanaka ....................... 348/467 |
| 6,976,135 | B1 | | 12/2005 | Talbot et al. |
| 7,047,364 | B2 | * | 5/2006 | Hassane ..................... 711/133 |
| 7,107,044 | B1 | * | 9/2006 | Zaidi et al. ................ 455/412.1 |
| 7,133,981 | B2 | | 11/2006 | Hill et al. |
| 7,216,183 | B2 | | 5/2007 | Ho et al. |
| 7,233,977 | B2 | * | 6/2007 | Gupta et al. ................. 709/216 |
| 7,320,056 | B2 | * | 1/2008 | Shimada et al. ............. 711/147 |
| 2006/0155907 | A1 | * | 7/2006 | Yoshida et al. .............. 710/260 |
| 2006/0190637 | A1 | * | 8/2006 | Maki et al. .................... 710/22 |
| 2007/0226422 | A1 | * | 9/2007 | Mino et al. .................. 711/137 |

FOREIGN PATENT DOCUMENTS

JP    2002-082901    3/2002

OTHER PUBLICATIONS

IEEE Xplore Digital Library: "Using dummy reads to maintain consistency in heterogeneous database systems", Publication Date: Apr. 14-16, 1992, abstract, 1 page.*

* cited by examiner

*Primary Examiner*—Mark Rinehart
*Assistant Examiner*—Trisha Vu
(74) *Attorney, Agent, or Firm*—Turocy & Watson, LLP

(57) ABSTRACT

A bus control apparatus includes a plurality of blocks configured to output a write command for writing data into memory via a bus, and a bus connection control unit provided in correspondence with each of the blocks. The bus connection control unit monitors signals between the bus and the block, and upon detecting a read command signal for reading data in a cause register of the block, blocks connection of a signal line between the block and the bus and outputs a dummy read command signal for the memory. The bus connection control unit releases blockage when a response signal for the dummy read command signal is received.

20 Claims, 7 Drawing Sheets

BUS CONTROL APPARATUS AND BUS CONTROL METHOD

CROSS REFERENCE TO RELATED APPLICATION

This application is based upon and claims the benefit of priority from the prior Japanese Patent Application No. 2007-108394 filed on Apr. 17, 2007; the entire contents of which are incorporated herein by this reference.

BACKGROUND OF THE INVENTION

1. Field of the Invention

The present invention relates to a bus control apparatus and a bus control method, and more particularly, to a bus control apparatus including one or more blocks configured to output a write command signal for writing data into memory via a bus, and a bus control method.

2. Description of the Related Art

There have been known apparatuses in which data is transmitted/received between functional blocks via a bus. For example, in recent apparatuses, a number of blocks on a System-on-Chip (SoC) transmit/receive data to and from each other by way of a system bus and via shared memory that is connected to the chip.

By way of example, when a block A is to transfer data to another block B, the block A transfers and writes the data to shared memory, and when the data transfer is finished, the block A notifies the block B of the completion of data transfer. The block B can then read the data from the block A by transferring the data from a storage area of the shared memory in which the data is written.

Due to a necessity of data consistency, it is a precondition for data transfer in such a shared-memory configuration that operations at each phase of data transfer must be completed before processing for a next phase takes place. The bus on which data is transmitted/received may be a shared bus or a point-to-point bus.

Meanwhile, many of modern bus architectures use a bus protocol which adopts a posted write scheme as a standard way of writing to a bus in order to improve bus efficiency. In the posted write scheme, when a block writes to shared memory, the block considers writing to be completed at a point when the block has finished passing a write command and data to be written to a bus. The data will be actually written to the memory when the bus and the memory (including a controller) are ready for writing.

However, some attention needs to be paid when data is exchanged according to such a procedure on a bus that uses the posted write scheme. It is a problem of memory consistency or coherency, which means correct read data cannot be retrieved unless reading by the other block B is carried out after the posted write reaches the shared memory.

General ways for maintaining data coherency include methods based on a bus protocol, hardware (hereinafter also abbreviated as HW) implementation, software (hereinafter also abbreviated as SW) implementation, or some combination of SW and HW implementations, which are already realized.

Some methods based on a bus protocol use non-posted write for a write that is used in common with other blocks.

However, a bus protocol-based method has a problem of involving complex HW implementation for executing the protocol. In general, implementation of non-posted write is more complex than that of posted write. In addition, performance of HW, especially throughput and overhead in terms of operating frequency, may present a problem.

For hardware implementation-based methods, there is an address interlocking technique, which identifies dependencies among all write and read addresses and makes reading wait as required. For example, a read from an address which is not related to an address at which data was written needs not to be made to wait, whereas a read from an address which is related to an address at which data was written needs to be made to wait. The address interlocking technique thus identifies a dependency between write and read addresses and decides whether or not to make a read wait.

However, a problem with methods based on HW implementation is that HW implementation is complex. Moreover, most portions of general shared buses are not typically involved in transaction between separate blocks. Therefore, application of address interlocking in every transaction can present a problem in terms of performance, especially throughput and operating frequency.

Japanese Patent Laid-Open No. 2002-82901 proposes a technique for a software implementation-based method in which a block as a data source issues a dummy read after a data write in order to confirm the write. This proposed technique presupposes a bus protocol using the posted write scheme with a restriction that when a read is issued by a same block, any write before the issuance must be completed.

However, methods based on software implementation generally have a problem of processing being sometimes extremely complex. Because of this fact, when a vendor supplying SoC chips leaves software implementation to a customer, for example, the customer might not be able to accept software implementation that involves such complex processing.

SUMMARY OF THE INVENTION

According to an aspect of the present invention, a bus control apparatus can be provided that includes: one or more blocks configured to output a write command signal for writing data to memory via a bus; and a bus connection control unit which is provided in correspondence with each of the blocks and configured to monitor signals on a signal line between the bus and the block, and upon detecting a read command signal for reading data in a predetermined register of the block, to block connection of the signal line between the block and the bus, output a dummy read command signal for the memory, and release blockage when a response signal to the dummy read command signal is received.

DETAILED DESCRIPTION OF THE PREFERRED EMBODIMENTS

An embodiment of the invention will be described with reference to the drawings.

Figure 1:
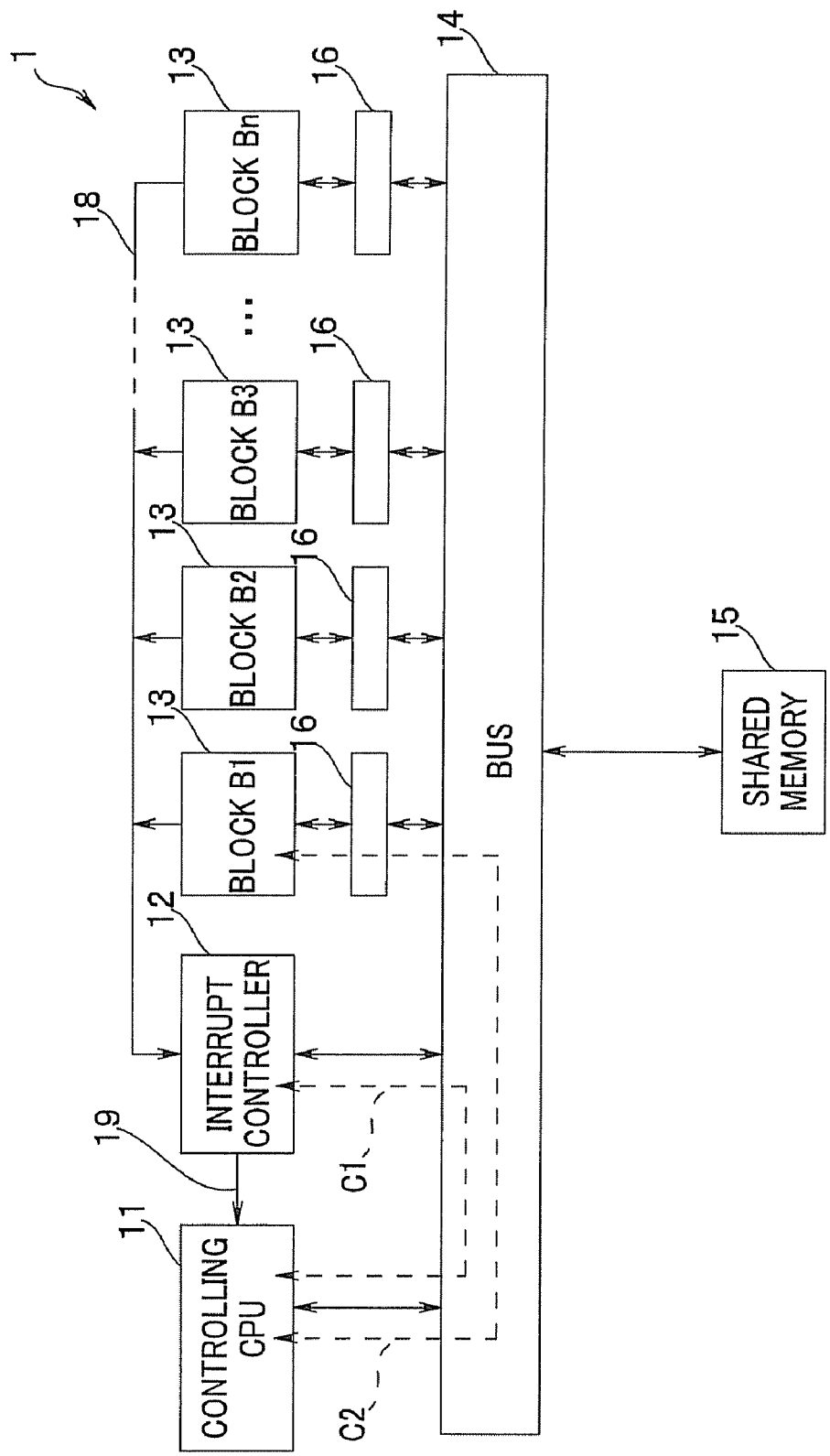
FIG. 1 is a block diagram showing a configuration of a bus control apparatus according to an embodiment of the present invention.

First, with respect to FIG. 1, a configuration of a bus control apparatus according to the present embodiment will be described. FIG. 1 is a block diagram showing the configuration of the bus control apparatus according to the present embodiment.

As shown in FIG. 1, a bus control apparatus 1 includes a central processing unit (hereinafter called a "controlling CPU") 11 for bus control, an interrupt controller 12, a plurality of blocks 13 which are functional blocks each performing predetermined processing, a bus 14 as a system bus, shared memory 15, and a bus connection control unit 16 provided between each of the blocks 13 and the bus 14. There are n blocks 13 (n being a positive integer), each connected to the bus 14 via the bus connection control unit 16. The bus control apparatus 1 of FIG. 1 is formed as a semiconductor circuit on a semiconductor chip as a semiconductor device, for example.

The plurality of blocks 13 are connected with the interrupt controller 12 through a dedicated signal line 18. The controlling CPU 11 and interrupt controller 12 are individually connected to the bus 14, and the controlling CPU 11 and the interrupt controller 12 are also connected with each other through a separate signal line 19. The controlling CPU 11 and the interrupt controller 12 can also transmit/receive data to/from each other via the bus 14. As to be discussed later, when one of the blocks 13 has written data (hereinafter also referred to as a write) to the shared memory 15, the block outputs an interrupt signal to the interrupt controller 12 through the signal line 18. Upon receiving the interrupt signal, the interrupt controller 12 outputs a signal for notifying the controlling CPU 11 of occurrence of an interrupt via the signal line 19.

The plurality of blocks 13 are functional blocks each performing predetermined processing; the blocks 13 can have functions like a core CPU, ROM, a hard disk drive (HDD), a DMAC, a network controller, any of various interfaces, for instance. Depending on the function of the block 13, the block 13 may be directly connected with the bus 14 without passing through the bus connection control unit 16. For example, if the block 13 is a functional block like a hardware timer, the block 13 is connected to the bus 14 without the bus connection control unit 16.

In the present embodiment, the bus control apparatus 1 is realized as an SoC, and the shared memory 15 may be provided on the SoC or connected to the SoC.

Figure 2:
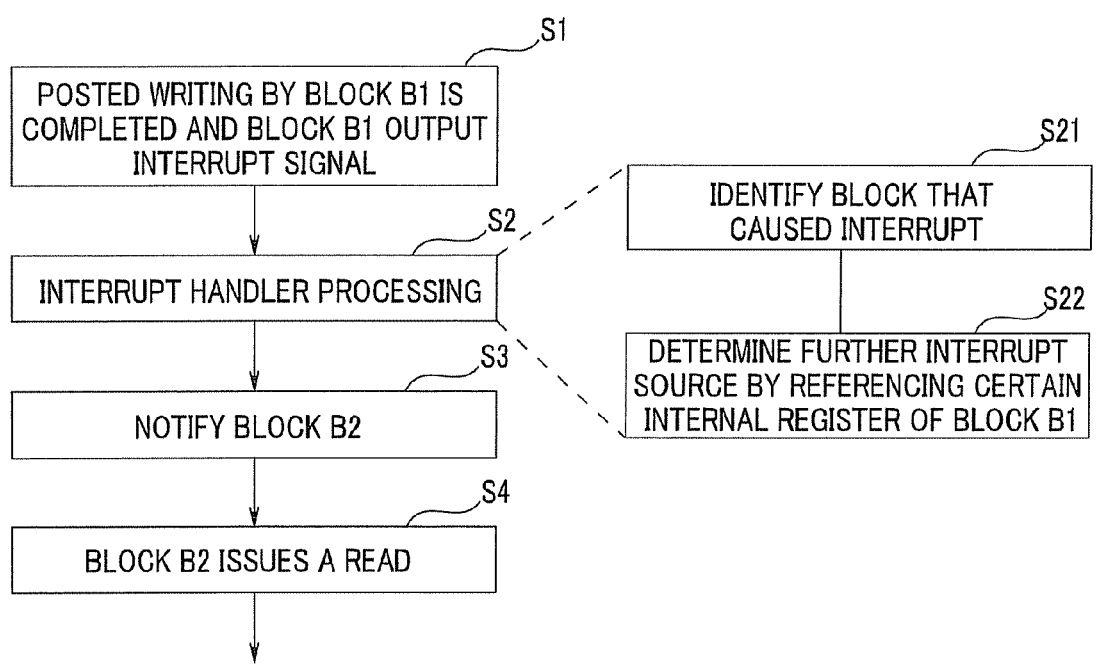
FIG. 2 is a sequence chart illustrating a flow of data transfer processing according to an embodiment of the present invention.

FIG. 2 is a sequence chart for illustrating a flow of data transfer processing in the bus control apparatus 1. FIG. 2 shows in greater detail the flow of processing in which when data is to be transferred between separate blocks via shared memory, a block which transfers the data uses the posted write scheme to write the data and then notifies the other block to which the data will be transferred of the data write, after which the other block reads out the data (hereinafter also called a read). The following description illustrates a case where data is transferred from a block B1 to a block B2 of the plurality of blocks 13.

As shown in FIG. 2, the block B1 first writes data which it makes the block B2 read at a predetermined address of the shared memory 15 by the posted write (step S1). When the writing is finished, the block B1 outputs an interrupt signal to the interrupt controller 12.

Upon a receipt of the interrupt signal, the interrupt controller 12 notifies the controlling CPU 11 that the interrupt signal has been issued and the controlling CPU 11 executes predetermined interrupt handler processing (step S2).

In the interrupt handler processing, block identification processing for identifying blocks involved in the interrupt (step S21) and source determination processing for determining a source of the interrupt (step S22) are performed.

In identification of blocks that are involved in the interrupt (step S21), the controlling CPU 11 identifies a block which output the interrupt signal by reading contents of a predetermined register which is associated with interrupt signals and provided in the interrupt controller 12 via the bus 14. Arrow C1 in FIG. 1 indicates that the controlling CPU 11 reads the contents of the predetermined register in the interrupt controller 12.

After the block which issued the interrupt signal is identified at step S21, the controlling CPU 11 determines the source of the interrupt by referencing a predetermined internal register in the identified block via the bus 14 at step S22. In this example, the block B1 is determined to have output the interrupt signal, and then the interrupt source (i.e., data transfer to the block B2) is determined by reading the contents of the predetermined internal register in the block B1. Arrow C2 in FIG. 1 indicates that the controlling CPU 11 reads the contents of the predetermined register in the block B1.

In other words, the controlling CPU 11 can determine from the interrupt signal that data writing to the shared memory 15 for data transfer to the block B2 is completed.

The controlling CPU 11 then notifies the block B2 that there has been a data transfer (step S3).

In response, the block B2 issues a command signal for reading the data from the shared memory 15 (step S4). When the block B2 receives the data, reading is completed. Through this process, data is transferred from the block B1 to B2.

FIGS. 3 through 8 illustrate functions of the bus connection control unit 16 configured to pass or block signals between the block and the bus. As discussed below, to confirm data written by the block B1 in the shared memory 15, the bus connection control unit 16 issues a dummy read signal when a trigger signal has been issued. While the dummy read is being issued, the bus connection control unit 16 blocks passage between the block B1 and the bus 14, and reopens the passage when a response to the dummy read is returned.

As illustrated in FIGS. 3 through 8, the bus connection control unit 16 controls signal flows from the bus 14 to the block B1 as well as from the block B1 to the bus 14.

In general, between separate blocks, an interrupt signal is used as a trigger signal for providing prescribed notification to the other block. Thus, an interrupt signal is utilized for notification of transfer when data is transferred. For each of a plurality of interrupt signals, a number of sources are typically defined. After a block that caused an interrupt, namely a block that issued an interrupt signal is identified, reference is then made to an internal register in that block, that is, a register that indicates a cause of the interrupt, for determining the source, which is a common practice in SW implementation.

In this sense, it is general also in the present embodiment to reference the internal cause register within the block B1 when the block B1 issued an interrupt signal. Thus, focusing on the fact that reference to the cause register is not itself regarded as overhead in SW implementation, the bus control apparatus 1 of the present embodiment presupposes a system configuration which performs notification with an interrupt signal in the course of data sharing or transfer between separate blocks. And the apparatus 1 utilizes a bus architecture with a mechanism which enables blockage of signals between the block 13 and the bus 14 in a connection relationship between each block 13 and the bus 14 under a certain condition.

This mechanism will be hereinafter called dummy read packing.

Operations of dummy read packing will be described below.

Figure 3:
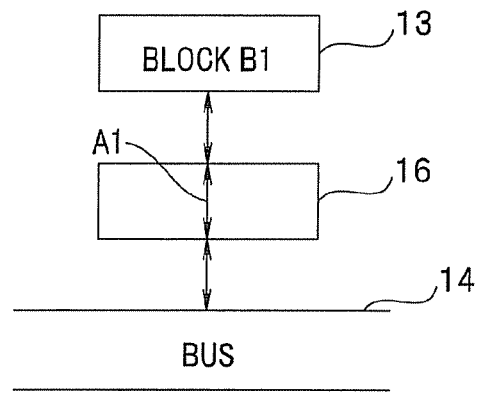
FIG. 3 illustrates functions of a bus connection control unit according to the present embodiment.

As shown in FIG. 3, in a normal state, signals can be transmitted and received between the block B1 and the bus 14. In FIG. 3, arrow A1 indicates that signals pass in both directions between the block B1 and the bus 14. That is, in a normal state, bus protocol signals are allowed to pass between the block B1 and the bus 14.

However, once the bus connection control unit 16 has received a signal for reading data (hereinafter called a "cause register read command") in the predetermined internal register of the block B1 (hereinafter called a "cause register") from the controlling CPU 11, the bus connection control unit 16 blocks signals between the block B1 and the bus 14 in order to carry out predetermined processing which is discussed below.

The cause register read command is detected by monitoring commands and addresses, and more specifically, based on whether a command is a read command and an address from which data should be read is a predetermined address or not.

Figure 4:
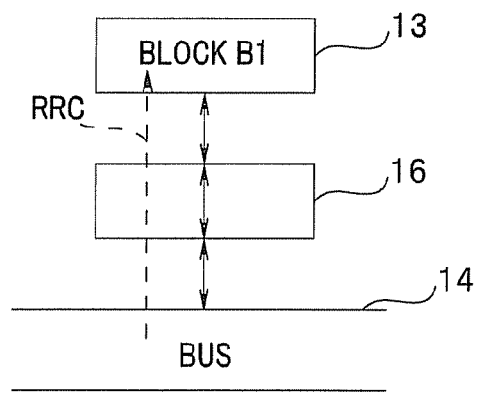
FIG. 4 illustrates functions of the bus connection control unit according to the present embodiment.
Figure 5:
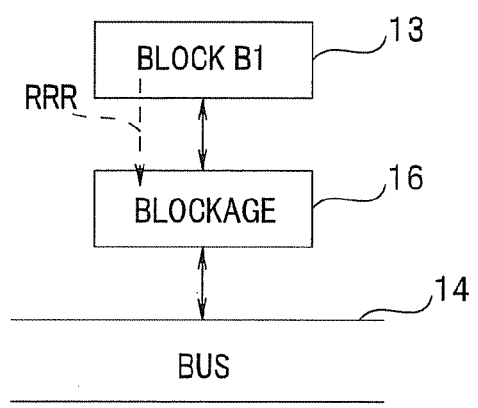
FIG. 5 illustrates functions of the bus connection control unit according to the present embodiment.

The cause register read command RRC is received by the bus connection control unit 16, and through the bus connection control unit 16, supplied from the bus 14 to the block B1 as indicated by a dotted line in FIG. 4. Upon receiving the cause register read command signal RRC, the bus connection control unit 16 blocks signal passage between the block B1 and the bus 14 as shown in FIG. 5 since the cause register read command signal RRC is a trigger signal. Signal blockage between the block B1 and the bus 14 is realized by blocking the flow of signals on the bus between the block 13 and the bus 14. As described above, when the bus connection control unit 16 receives the cause register read command RRC, the bus connection control unit 16 blocks signals between that block and the bus 14 with the cause register read command as a trigger signal.

Such blockage is effected between the block 13 and the bus connection control unit 16, and between the bus connection control unit 16 and the bus 14 such that the bus protocol is not violated. For example, the bus connection control unit 16 performs blockage so as to meet such a condition that signals are not blocked in busy state and blocked when not in busy state.

As mentioned above, the bus connection control unit 16 determines whether or not a signal is a trigger signal for blocking signal flow based on whether or not the signal is a command that requests a read from the predetermined cause register the in the block B1.

If the signal is not a command that requests a read from the cause register (i.e., a command other than the cause register read command RRC), the bus connection control unit 16 does not block signals.

When the bus connection control unit 16 has received a trigger signal, the bus connection control unit 16 withholds a response signal (hereinafter called a register read response) RRR for a read from the cause register which is performed in response to the cause register read command RRC. That is, the block B1 sends a register read response RRR for providing data in the cause register back to the controlling CPU 11 in response to the cause register read command RRC, but the bus connection control unit 16 withholds a transmission of the RRR.

This withholding can be effected by the bus connection control unit 16 outputting a signal (hereinafter called a No Receive signal) NR to the block B1 that indicates the controlling CPU 11 or bus 14 is not ready to receive data, for example. This means that the bus connection control unit 16 behaves as if it notified the block B1 that the controlling CPU 11 or bus 14 is unable to receive data, while for the controlling CPU 11, as if the block B1 had not sent a register read response RRR yet that includes data in the cause register.

In a state of withholding, that is, in a state in which the bus connection control unit 16 is notifying the block B1 that the controlling CPU 11 or bus 14 is unable to receive data by supplying the No Receive signal NR, the block B1 keeps issuing the register read response RRR.

Figure 6:
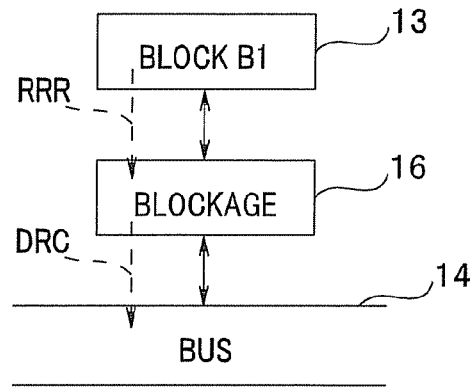
FIG. 6 illustrates functions of the bus connection control unit according to the present embodiment.

Next, while withholding the register read response RRR for the cause register, the bus connection control unit 16 which is connected to the block B1 issues a command signal for dummy reading (hereinafter called a dummy read command) DRC via the bus 14 to the shared memory 15, as shown in FIG. 6. The dummy read command DRC is a command for reading data at any address of the shared memory 15 from the block B1. The dummy read command DRC is supplied to the shared memory 15, and the shared memory 15 sends the data (a response signal) D1 back to the block B1. The shared memory 15 outputs the data onto the bus 14 irrespective of from which the dummy read command DRC is sent.

As the dummy read command DRC can be any command for reading data at any address of the shared memory 15 from the block B1, data which is read out for the dummy read command DRC does not have to be the data written by the block B1 for data transfer to the block B2. That is to say, the DRC only has to be a command for reading data at any address in the shared memory 15 from the block B1.

Figure 7:
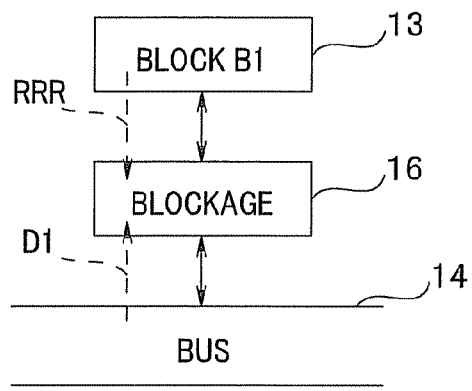
FIG. 7 illustrates functions of the bus connection control unit according to the present embodiment.
Figure 8:
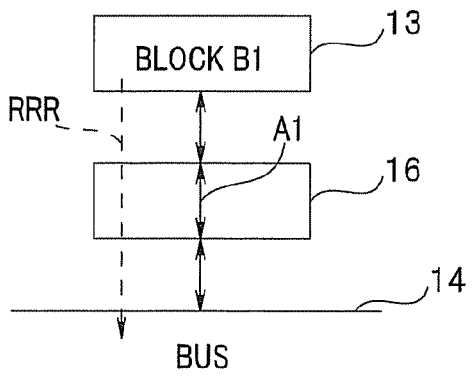
FIG. 8 illustrates functions of the bus connection control unit according to the present embodiment.

When the bus connection control unit 16 receives the response signal D1 for the dummy read command DRC the unit 16 sent, the bus connection control unit 16 determines that the data output by the block B1 for transfer to the block B2 was reliably written to the shared memory 15, as illustrated in FIG. 7. Accordingly, upon receiving the response signal D1 corresponding to the dummy read, the bus connection control unit 16 releases blockage of signals between the block B1 and the bus 14 as shown in FIG. 8.

The response signal D1 for the dummy read command DRC is returned from the bus 14, but the response signal D1 is not supplied to the block B1, but discarded without being used in any way here.

In such a manner, when the response signal D1 for the dummy read command DRC is returned, the bus connection control unit 16 recovers the connection between the block B1 and the bus 14. When the connection is recovered, the register read response RRR which has been withheld until then is supplied to the controlling CPU 11 via the bus connection control unit 16. As a result, the interrupt handler processing of FIG. 2 (step S2) terminates, so that the controlling CPU 11 notifies the block B2 that there was a data transfer from the block B1 to the block B2 (step S3). Then, the block B2 reads the data written by the block B1 from the shared memory 15, which completes the data transfer from the block B1 to B2.

Figure 9:
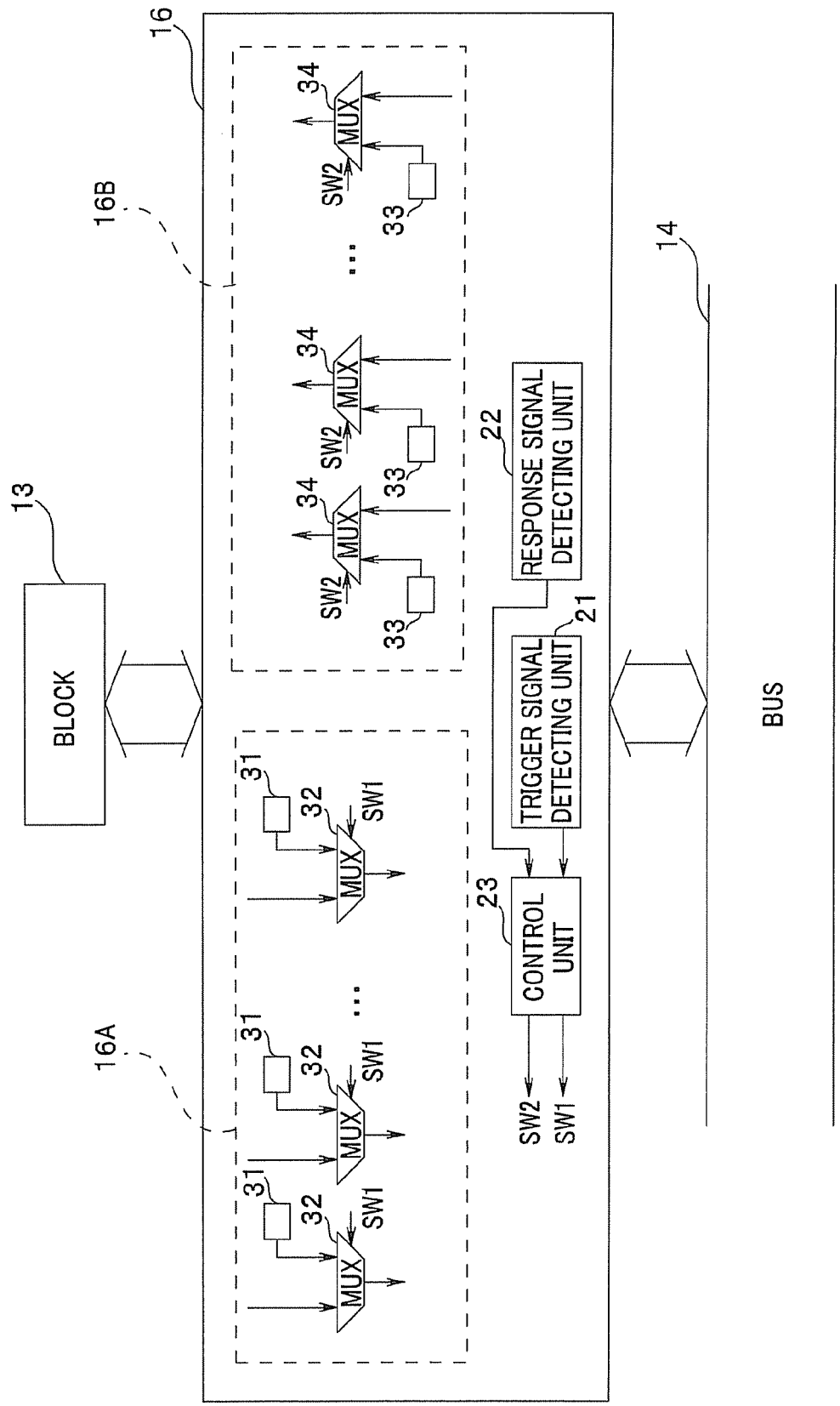
FIG. 9 illustrates a configuration of the bus connection control unit of the present embodiment.

A configuration of the bus connection control unit 16 discussed above is described next. FIG. 9 is a diagram for illustrating the configuration of the bus connection control unit 16 according to the present embodiment.

As shown in FIG. 9, the block 13 and the bus 14 are interconnected by a bus, but the bus connection control unit 16 is provided between the block 13 and the bus 14. The bus connection control unit 16 includes a plurality of multiplexers (MUXs). The multiplexers (MUXs) include a multiplexer group 16A for supplying signals from the block 13 to the bus 14 and a multiplexer group 16B for supplying signals from the bus 14 to the block 13. The bus connection control unit 16 also includes a trigger signal detecting unit 21 with a read command detecting unit, a response signal detecting unit 22, and a control unit 23 configured to output a switching signal as a control signal for controlling the multiplexers (MUXs) in accordance with signals from the trigger signal detecting unit 21 and response signal detecting unit 22.

Each of the multiplexers is a signal switching unit which is composed of a circuit for selecting one of two inputs and outputting the selected one to an output. The multiplexer group 16A includes a plurality of multiplexers 32 configured to input a signal from the block 13 and one from a register 31 and select either one of the signals based on a switching signal SW1 from the control unit 23 so as to supply the selected signal to the bus 14. The multiplexer group 16B includes a plurality of multiplexers 34 configured to input a signal from the bus 14 and one from a register 33 and select either one of the signals based on a switching signal SW2 from the control unit 23 so as to supply the selected signal to the block 13.

In the normal state mentioned above, the multiplexers 32 of the multiplexer group 16A as signal switching units are placed in a state in which they select and output signals from the block 13 so as to supply signals from the block 13 to the bus 14 without modification. Similarly, in the normal state, the multiplexers 34 of the multiplexer group 16B as signal switching units are placed in a state in which they select and output signals from the bus 14 so as to supply signals from the bus 14 to the block 13 without modification.

The trigger signal detecting unit 21 constitutes a read command detecting unit configured to monitor a certain signal from the bus 14 and determine whether the cause register read command RRC described above has been received or not. The trigger signal detecting unit 21 determines whether the cause register read command RRC has been received or not by monitoring signals on a signal line on which the cause register read command RRC can be detected among signals lines that are input to the multiplexer group 16B. When the trigger signal detecting unit 21 detects that the cause register read command RRC has been received, the trigger signal detecting unit 21 outputs an RRC reception signal indicating the reception of the cause register read command RRC to the control unit 23.

The response signal detecting unit 22 monitors signals from the bus 14 and determines whether or not a response signal D1 to a dummy read command DRC has been received. The response signal detecting unit 22 determines whether or not the response signal D1 has been received by monitoring signals on a signal line on which the response signal D1 can be detected among signals lines that are input to the multiplexer group 16B. Upon detecting that the response signal D1 has been received, the response signal detecting unit 22 outputs a D1 reception signal indicative of reception of the response signal D1 to the control unit 23.

When the cause register read command RRC is input, the control unit 23 outputs the switching signal SW1 to the multiplexers 32 of the multiplexer group 16A for selecting output from the register 31 and blocking signals from the block 13 to the bus 14. Accordingly, the control unit 23 and each of the multiplexers 32 constitute a blocking unit. In response to the switching signal SW1, each of the multiplexers 32 selects data signals from the register 31, so that the bus connection control unit 16 can generate and output a dummy read command DRC to the bus 14. Thus, the control unit 23, each multiplexer 32, and each register 31 constitute a dummy read command signal output unit.

Timing of signal blockage in response to the switching signal SW1 is controlled separately for command and data signals. For example, blocking of command signals in response to the switching signal SW1 is immediately effected so that no further commands are issued if output of a command to the bus 14 from the block 13, e.g., a write command, is completed. However, if output of data from the block 13 to the bus 14, such as written data, is not completed, signals are blocked after the transfer of the written data is finished in order to complete the transfer of the written data corresponding to a write command.

When the cause register read command RRC is input, the control unit 23 outputs a switching signal SW2 to predetermined multiplexers 34 of the multiplexer group 16B for selecting output from the register 33 and blocking signals from the bus 14 to the block 13. Thus, the control unit 23 and each of the multiplexers 34 constitute the blocking unit. In response to the switching signal SW2, the predetermined multiplexers 34 select data signals from the register 33 so that the bus connection control unit 16 can generate and output a No Receive signal NR to the block 13. Thus, the control unit 23, each multiplexer 34, and each register 33 constitute a No Receive signal generating unit.

Furthermore, when the D1 reception signal is input, the control unit 23 outputs the switching signal SW1 to predetermined multiplexers 32 of the multiplexer group 16A for selecting signals from the block 13 and outputting the signals to the bus 14. In response to the switching signal SW1, the predetermined multiplexers 32 select data signals from the block 13, which enables the bus connection control unit 16 to pass signals from the block 13 to the bus 14.

Similarly, when the D1 reception signal is input, the control unit 23 outputs the switching signal SW2 to the multiplexers 34 of the multiplexer group 16B for selecting signals from the bus 14 and outputting the signals to the block 13. In response to the switching signal SW2, the multiplexers 34 each select data signals from the bus 14, so that the bus connection control unit 16 can again pass signals from the bus 14 to the block 13.

In the blocked state, the predetermined multiplexers 32 of the multiplexer group 16A are placed in a state in which the multiplexers 32 select and output signals from the register 31 which is connected to the multiplexers 32 so as to supply data signals from the register 31 to the bus 14. Similarly, in the blocked state, the predetermined multiplexers 34 of the multiplexer group 16B are placed in a state in which they select and output signals from the register 33 which is connected to the multiplexers 34 so as to supply data signals from the register 33 to the block 13.

Therefore, the No Receive signal NR output by the bus connection control unit 16 in the blocked state mentioned above is generated by a data signal from the register 33. Similarly, the dummy read command DRC output by the bus connection control unit 16 in the blocked state is generated by a data signal from the register 31.

The contents of the registers 31 and 33 are configured to permit setting from outside. The multiplexers each output the contents of corresponding one of the registers 31 and 33 in the blocked state, but a register that is not associated with the dummy read command DRC or No Receive signal NR is masked so as not to output signals.

In addition, although the bus connection control unit 16 is realized with the trigger signal detecting unit 21, response signal detecting unit 22, control unit 23 and so forth, the bus connection control unit 16 may also be realized as a state machine that operates in accordance with various signal lines, an internal state of various registers and the like.

The bus control apparatus according to the above-described embodiment can maintain coherency of transferred data without using complex circuits in terms of hardware implementation but with simple processing from a software standpoint while using the posted write scheme. That is to say, when data written by one block is read by another block, the order of associated commands is 100% guaranteed.

In particular, according to the above-described embodiment, since interrupts are handled as has been conventionally done, HW and SW configurations can be made simple.

Thus, according to the above-described embodiment, it is possible to realize a bus controlling architecture for guaranteeing coherency when data is exchanged between separate blocks via shared memory without complicating HW and SW implementations and without significant performance degradation.

In addition, since the above-described embodiment uses a generic bus protocol rather than a special one and does not require modification to the blocks themselves, application to an existing IP can be easily implemented.

Next, a block configuration according to a variation of the above-described embodiment will be described.

Figure 10:
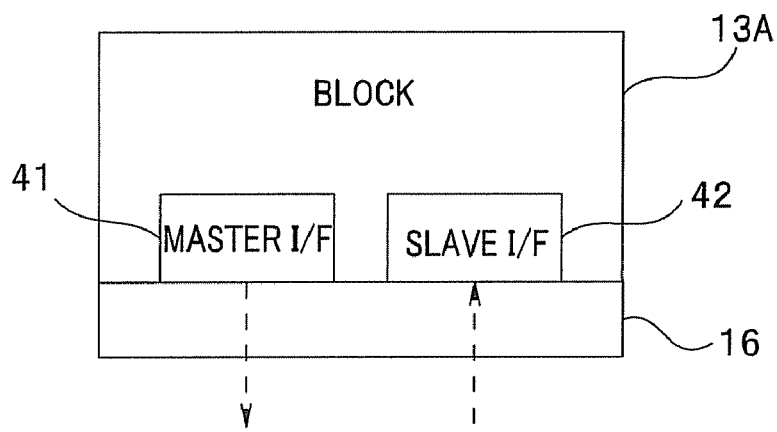
FIG. 10 illustrates a variation of blocks according to the present embodiment.

FIG. 10 illustrates a variation of the block 13. For some bus configurations, signal lines for inputting/outputting commands or data may be predetermined. FIG. 10 illustrates a block configuration for such a case, wherein a block 13A has a master interface (hereinafter abbreviated as a master I/F) 41 and a slave interface (hereinafter abbreviated as slave I/F) 42. Such a configuration with master and slave I/Fs is a configuration compliant with OCP 2.0 developed by Open Core Protocol International Partnership (OCP-IP), a standardization group, for instance.

A plurality of blocks each having the configuration as shown in FIG. 10 are connected to the bus 14 to perform data transfer and the like thereon. Each block connected to the bus 14 has a master I/F and a slave I/F. Some of the blocks connected to the bus 14 may only have the master I/F and not the slave I/F or vice versa depending on their function.

The master I/F 41 is an interface for outputting commands to the slave I/F 42 of another block. For example, the master I/F 41 outputs a write or read command, outputs written data, or inputs read data. The slave I/F 42 is an interface for inputting commands from the master I/F 41 of another block. For example, the slave I/F 42 receives a read command and outputs read data. The bus connection control unit 16 described above is provided between the bus 14 and the two interfaces, i.e., the master I/F 41 and the slave I/F 42.

Accordingly, in a configuration like the block 13A of FIG. 10, when a cause register read command signal RRC received via the slave I/F 42 is detected by the bus connection control unit 16 as a trigger signal, the bus connection control unit 16 blocks paths of command and data input/output between the bus 14 and the slave I/F 42 as well as between the master I/F 41 and the bus 14.

As a result of the blockage, the bus connection control unit 16 withholds a register read response RRR from the master I/F 41 which corresponds to the cause register read command signal RRC.

After blocking the paths, the bus connection control unit 16 further outputs a dummy read command DRC to the shared memory 15. Upon receiving a response signal D1 corresponding to the dummy read command DRC, the bus connection control unit 16 discards the response signal D1 and releases the blockage described above. As this release reopens the signal paths between the master I/F 41 and the bus 14 and between the slave I/F 42 and the bus 14, the register read response RRR from the slave I/F 42 is output to the bus 14. As a result, it is ensured that the data output by the block 13A has been reliably written to the shared memory 15, thus the controlling CPU 11 notifies a block as a destination of the transferred data that there was a data transfer from the block 13A. The destination block then reads out the data written by the block 13A from the shared memory 15, which thereby completes data transfer from the block 13A.

Figure 11:
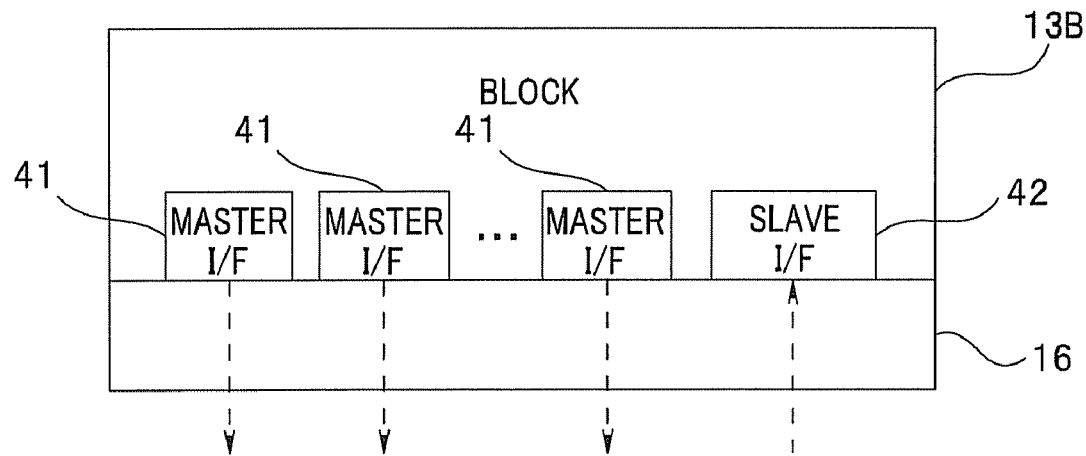
FIG. 11 illustrates a further variation of the blocks according to the present embodiment.

Additionally, as shown in FIG. 11, each block may also have a plurality of master I/Fs 41 and one slave I/F 42. FIG. 11 illustrates a further variation of the block 13.

Figure 12:
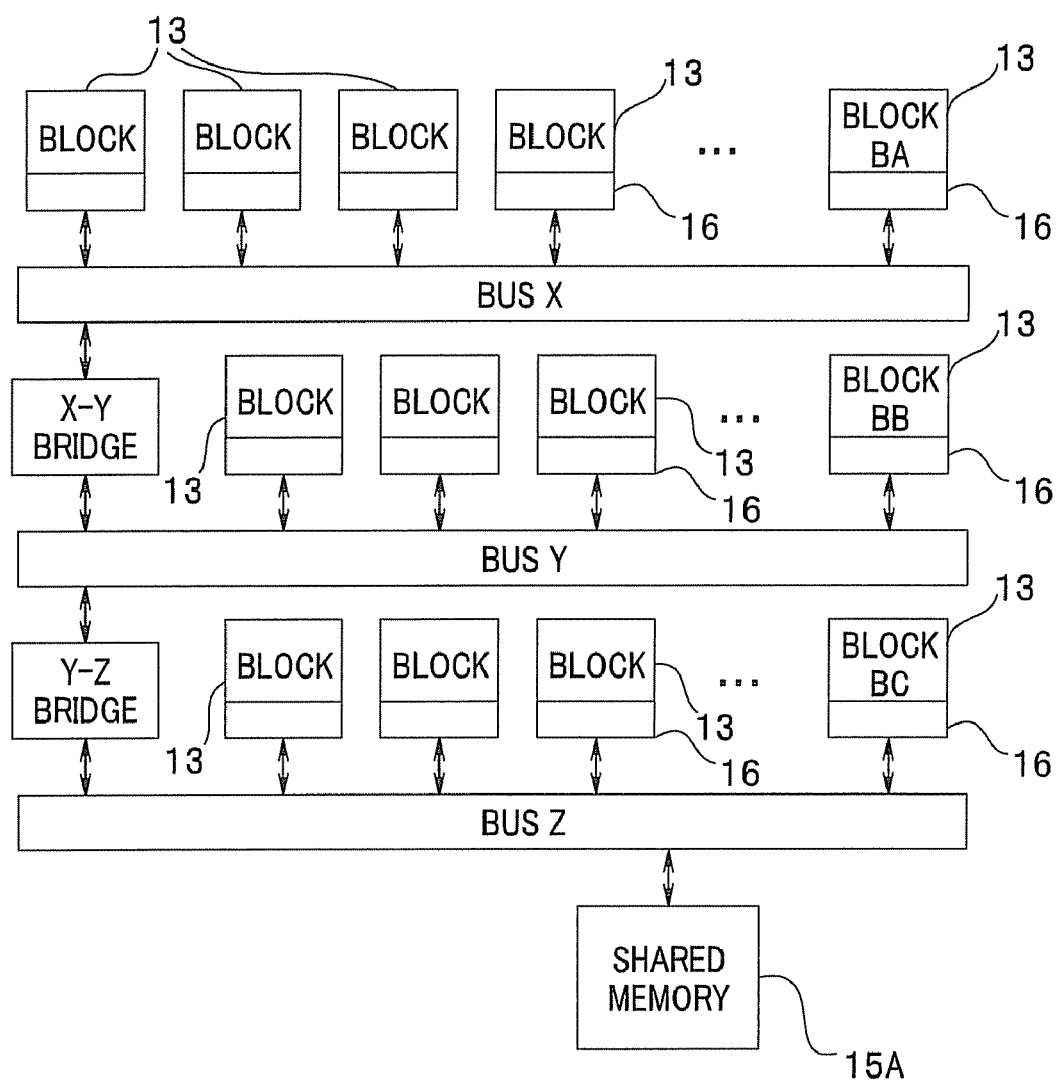
FIG. 12 is a block diagram showing a bus architecture having a plurality of bus protocols in which a plurality of blocks are each connected to a corresponding bus according to the present embodiment.

Furthermore, the bus control apparatus of the present embodiment is also applicable to a system having a number of buses as illustrated in FIG. 12. FIG. 12 is a block diagram showing a bus architecture with a number of bus protocols in which a plurality of blocks are each connected to a corresponding bus.

In FIG. 12, a plurality of blocks 13 are connected to a bus X, another plurality of blocks 13 to a bus Y, and yet further blocks 13 to a bus Z.

The buses X and Y are interconnected by an X-Y bridge as a bus bridge. The buses Y and Z are interconnected by a Y-Z bridge as a bus bridge.

Each of the blocks 13 and a corresponding bus are connected with each other via the bus connection control unit 16 described above.

Also in FIG. 12, the bus connection control unit 16 provided between each block 13 and each bus performs a series of processes of blocking data transmission/reception between a block and a bus which are connected with each other upon detection of the predetermined cause register read command RRC, issuing a dummy read command DRC during the blockage, and releasing the blockage when a response signal D1 for the dummy read command DRC is returned.

In the bus architecture with the three buses X, Y and Z interconnected by bridges as shown in FIG. 12, when a write to the shared memory 15A carried out by a block BA connected to the bus X is to be confirmed, for example, dummy read packing that depends on the block BA and bus X should be executed. In this case, the shared memory 15A has to be read for the dummy read command DRC.

Similarly, when a write to the shared memory 15A carried out by a block BB connected to the bus Y is to be confirmed, dummy read packing depending on the block BB and the bus Y should be executed. Likewise, when a write to the shared memory 15A carried out by a block BC connected to the bus Z is to be confirmed, dummy read packing depending on the block BC and the bus Z should be executed.

Also in the case of FIG. 12, since a cause register read command RRC for the cause register of the block concerned is used as a trigger signal for issuing a dummy read command DRC for write confirmation, dummy read packing that considers only the protocol of a bus to which the block is connected should be carried out. That is to say, the bus connection control unit 16 need not take into consideration the bus on the other side of each bridge. Also, the cause register read command RRC as a trigger signal for dummy reading may be issued by any bus.

As has been described, the bus control apparatus and method according to the present embodiment and variations described above can maintain the coherency of written data without using a complex circuit in terms of hardware implementation but with simple processing from a software standpoint even when the posted write scheme is employed.

The present invention should not be limited to the above-described embodiment and various changes and modifications are possible without departing from the spirit of the present invention.

What is claimed is:

1. A bus control apparatus, comprising:
one or more blocks configured to output a write command signal for writing data to memory via a bus; and
a bus connection control unit which is provided in correspondence with each of the blocks and configured to monitor signals on a signal line between the bus and the block, and upon detecting a read command signal for reading data in a predetermined register of the block, to block connection of the signal line between the block and the bus, output a dummy read command signal for the memory, and release blockage when a response signal to the dummy read command signal is received.

2. The bus control apparatus according to claim 1, wherein the bus connection control unit comprises:
a read command detecting unit configured to detect a reception of the read command signal;
a blocking unit configured to block connection of the signal line between a corresponding block and the bus when the read command signal is detected by the read command detecting unit;
a dummy read command signal output unit configured to output the dummy read command signal for the memory after the connection of the signal line is blocked by the blocking unit; and
a response signal detecting unit configured to detect the response signal,
wherein the bus connection control unit releases the blockage when the response signal is detected by the response signal detecting unit.

3. The bus control apparatus according to claim 2, wherein the blocking unit has a plurality of signal switching units each including two inputs and an output, and configured to perform switching so as to output a signal from either one of the two inputs to the output based on a switching signal,
some of the plurality of signal switching units output a signal from the corresponding block which is connected to a first one of the two inputs or a signal inputted to a first other input of the two inputs to the output which is connected to the bus based on the switching signal, and
some others of the plurality of signal switching units output a signal from the bus which is connected to a second one of the two inputs or a signal inputted to a second other input of the two inputs to the output which is connected to the corresponding block based on the switching signal.

4. The bus control apparatus according to claim 3, wherein the blocking unit performs the blockage by outputting the signals inputted to the first and the second other inputs to the outputs of the plurality of signal switching units.

5. The bus control apparatus according to claim 4, wherein
a first predetermined command register is connected to each of the first other inputs of the plurality of signal switching units which are the some of the plurality of signal switching units, and
the dummy read command signal output unit generates and outputs the dummy read command signal by outputting data in the first predetermined command register to the outputs of the plurality of signal switching units.

6. The bus control apparatus according to claim 5, wherein
a second predetermined command register is connected to each of the first other inputs of the plurality of signal switching units which are the some others of the plurality of signal switching units, and
the blocking unit generates and outputs a No Receive signal to the corresponding block by outputting data in the second predetermined command register to the outputs of the plurality of signal switching units.

7. The bus control apparatus according to claim 4, wherein
when the response signal detecting unit detects the response signal, the blocking unit releases the blockage by outputting the signals inputted to the first and the second one of the inputs to the outputs of the plurality of signal switching units based on the switching signal.

8. The bus control apparatus according to claim 1, wherein
a bus architecture including the bus has a plurality of buses including the bus, and the plurality of buses are interconnected each via a bus bridge.

9. The bus control apparatus according to claim 1, wherein
the block has a first interface configured to output command signals including the dummy read command signal to the bus, and a second interface to which command signals including the read command signal are input from the bus.

10. The bus control apparatus according to claim 1, wherein
the block has a plurality of first interfaces each configured to output command signals including the dummy read command signal to the bus, and a second interface to which command signals including the read command signal are input from the bus.

11. A bus control apparatus, comprising:
an interrupt control unit connected to a bus;
a control unit connected to the bus and configured to execute predetermined interrupt handling upon receiving a notification of reception of an interrupt signal from the interrupt control unit;
one or more blocks configured to output a write command signal for writing data to memory via the bus and, after outputting the write command signal, output an interrupt signal corresponding to the write command signal to the interrupt control unit; and
a bus connection control unit provided in correspondence with each block and configured to monitor signals on a signal line between the bus and the each block, and upon detecting a read command signal output by the control unit based on the interrupt signal for reading data in a predetermined register of the each block, to block connection of the signal line between the each block and the bus, output a dummy read command signal for the memory, and release blockage when a response signal for the dummy read command signal is received.

12. The bus control apparatus according to claim 11, wherein
the bus connection control unit comprises:
a read command detecting unit configured to detect a reception of the read command signal;

a blocking unit configured to block connection of the signal line between a corresponding block and the bus when the read command signal is detected by the read command detecting unit;

a dummy read command signal output unit configured to output the dummy read command signal for the memory after the connection of the signal line is blocked by the blocking unit; and a response signal detecting unit configured to detect the response signal, wherein the bus connection control unit releases the blockage when the response signal is detected by the response signal detecting unit.

13. The bus control apparatus according to claim 12, wherein the blocking unit has a plurality of signal switching units each including two inputs and an output, and configured to perform switching so as to output a signal from either one of the two inputs to the output based on a switching signal, some of the plurality of signal switching units output a signal from the corresponding block which is connected to a first one of the two inputs or a signal inputted to a first other input of the two inputs to the output which is connected to the bus based on the switching signal, and some others of the plurality of signal switching units output a signal from the bus which is connected to a second one of the two inputs or a signal inputted to a second other input of the two inputs to the output which is connected to the corresponding block based on the switching signal.

14. The bus control apparatus according to claim 13, the blocking unit performs the blockage by outputting the signals inputted to the first and the second other inputs to the outputs of the plurality of signal switching units.

15. The bus control apparatus according to claim 14, wherein a first predetermined command register is connected to each of the first other inputs of the plurality of signal switching units which are the some of the plurality of signal switching units, and the dummy read command signal output unit generates and outputs the dummy read command signal by outputting data in the first predetermined command register to the outputs of the plurality of signal switching units.

16. The bus control apparatus according to claim 15, wherein a second predetermined command register is connected to each of the first other inputs of the plurality of signal switching units which are the some others of the plurality of signal switching units, and the blocking unit generates and outputs a No Receive signal to the corresponding block by outputting data in the second predetermined command register to the outputs of the plurality of signal switching units.

17. The bus control apparatus according to claim 16, wherein when the response signal detecting unit detects the response signal, the blocking unit releases the blockage by outputting the signals inputted to the first and the second one of the inputs to the outputs of the plurality of signal switching units based on the switching signal.

18. A bus control method for transferring data via memory between different blocks among a plurality of blocks which are connected to a bus, the method comprising:

outputting, by a block that writes the data to the memory, a write command signal for writing data to memory via the bus;

monitoring signals on a signal line between the bus and the block;

blocking connection of the signal line between the block and the bus when a read command signal for reading data in a predetermined register of the block is detected;

outputting a dummy read command signal for the memory after the blocking; and releasing the blockage when a response signal for the dummy read command signal is received.

19. The bus control method according to claim 18, wherein a bus architecture including the bus has a plurality of buses including the bus, and the plurality of buses are interconnected each via a bus bridge.

20. The bus control method according to claim 18, wherein each of the blocks has one or more first interfaces configured to output command signals including the dummy read command signal to the bus, and a second interface to which command signals including the read command signal are input from the bus.

* * * * *